United States Patent [19]
Burke et al.

[11] 3,730,478
[45] May 1, 1973

[54] TOOL FOR SQUEEZING OFF FLEXIBLE PIPE

[75] Inventors: Donald J. Burke; Judson C. Cole, both of Tulsa, Okla.

[73] Assignee: Continental Industries, Inc., Tulsa, Okla.

[22] Filed: Jan. 18, 1971

[21] Appl. No.: 107,074

[52] U.S. Cl...................................251/8, 72/470
[51] Int. Cl..................................................F16k 7/06
[58] Field of Search........251/4–10; 128/346; 72/454, 470

[56] References Cited

UNITED STATES PATENTS

| | | | |
|---|---|---|---|
| 3,477,686 | 11/1969 | Engelsher et al. | 251/10 |
| 3,630,481 | 12/1971 | McGay | 251/6 |
| 2,796,228 | 6/1957 | Kelly | 251/7 |
| 2,841,358 | 7/1958 | Russell et al. | 251/8 |
| 597,443 | 1/1898 | Thomas | 251/8 |
| 636,971 | 11/1899 | Forcier | 251/8 |
| 3,589,668 | 6/1971 | Gill | 251/8 |

FOREIGN PATENTS OR APPLICATIONS

| | | | |
|---|---|---|---|
| 68,337 | 8/1865 | France | 251/8 |
| 595,673 | 7/1925 | France | 251/8 |

Primary Examiner—Martin P. Schwadron
Assistant Examiner—Richard Gerard
Attorney—Head & Johnson

[57] ABSTRACT

A tool for squeezing off flexible pipe having a clamp with first and second clamp bars adaptable to receive flexible pipe therebetween, the bars having opposed flat pipe contacting surfaces configured such that the distance between the contacting surfaces is greater intermediate the length of the bars than near the ends, and means to force the clamp bars towards each other.

4 Claims, 5 Drawing Figures

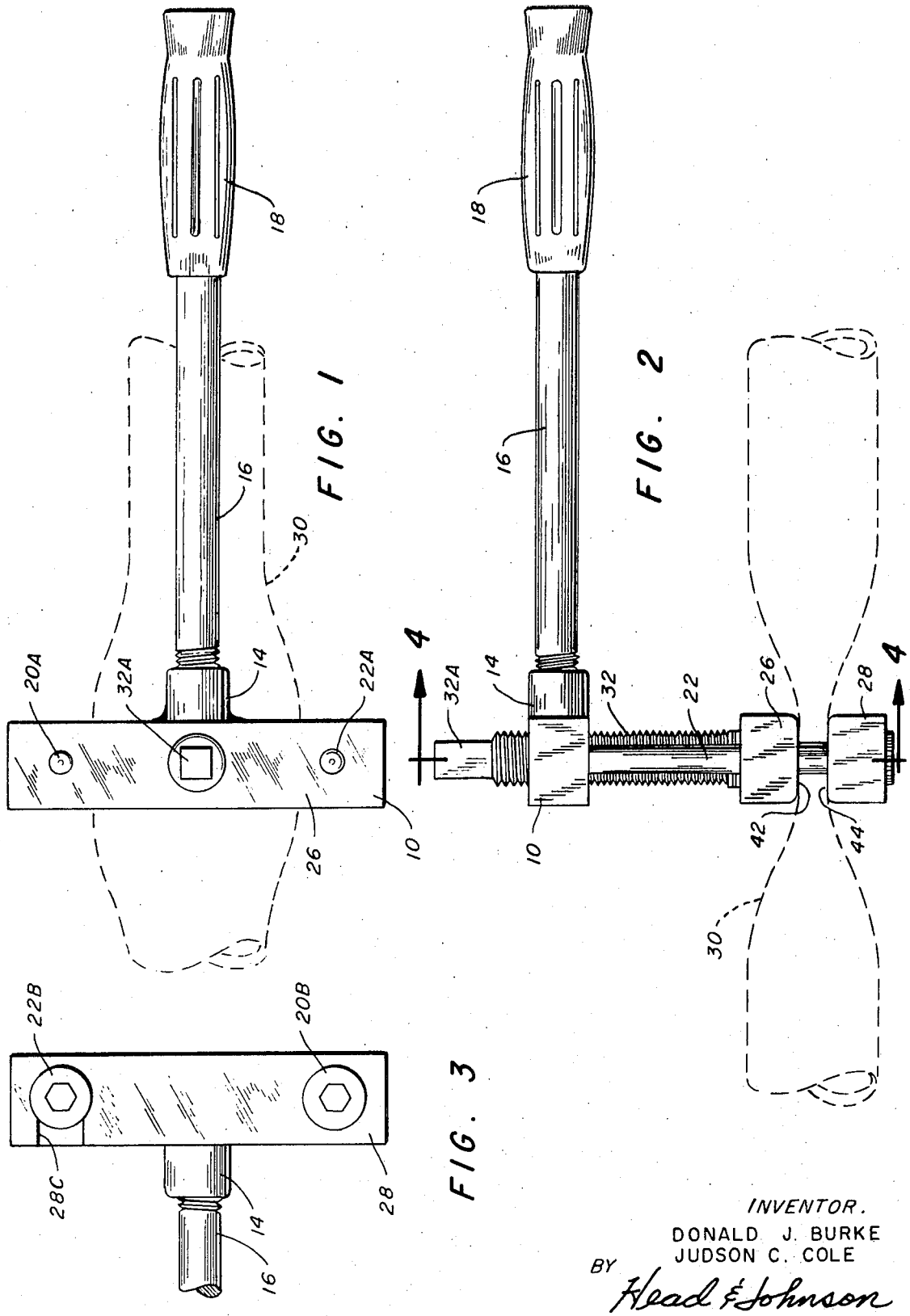

INVENTOR.
DONALD J. BURKE
JUDSON C. COLE
BY Head & Johnson
ATTORNEYS

TOOL FOR SQUEEZING OFF FLEXIBLE PIPE

BACKGROUND, SUMMARY AND OBJECTS OF THE INVENTION

In recent years the use of plastic pipe has become more widespread for water and gas distribution. The most common types of pipe utilized at this time for such purposes are polyvinylchloride and polyethylene pipe. To close off or control the flow of fluid or gases through such pipe valves have been manufactured of the metal type having means for adaptation to receive the plastic pipe, and in addition, all plastic valves are available. It is sometimes important, however, to be able to stop the flow of fluid or gas through flexible pipe at places in the pipe wherein no valve has been placed. It has been learned that some types of plastic pipe are subject to being closed by squeezing the pipe together.

Others have provided clamp arrangement for squeezing flexible pipe together to shut off flow through the pipe. This invention is an improved clamp for squeezing off flexible pipe. Of particular importance to the invention is the discovery that for effective closure of pipe against the flow of liquid or gas more force must be applied to squeeze the pipe together at the ends or edges of the fold than at the center. Others have provided clamps which provide equal force throughout the length of the area of squeeze as measured in plane perpendicular to the longitudinal axis of the pipe. Such known types of squeeze off tools are successful in some applications but not as dependable as desired, particularly as is desired for use by the gas industry where any slight leakage may result in an accumulation of gas to a dangerous amount.

It is therefore an object of this invention to provide an improved clamp for squeezing off flexible pipe.

More particularly, an object of this invention is to provide an improved clamp for squeezing off flexible pipe having means whereby more pressure is applied to the ends of the pipe fold as it is squeezed than to the center for more effective closure of the pipe.

Another object of this invention provides an improved tool for squeezing off flexible pipe including improved means of placing the clamp around the pipe to be squeezed and to provide a clamp having improved overall simplicity of operation, effectiveness of use, and economy and durability of construction.

These general objects, as well as more specific objects, will be fulfilled by a tool for squeezing off pipe to be now described in the following description and claims, taken in conjunction with the attached drawings.

DESCRIPTION OF VIEWS

FIG. 1 is a top view of a tool of this invention as used to squeeze off a flexible pipe shown in dotted outline.

FIG. 2 is a side view of the tool shown in FIG. 1.

FIG. 3 is a bottom view of the tool shown in FIGS. 1 and 2, but shown without relation to a flexible pipe.

DETAILED DESCRIPTION

Figure 4:
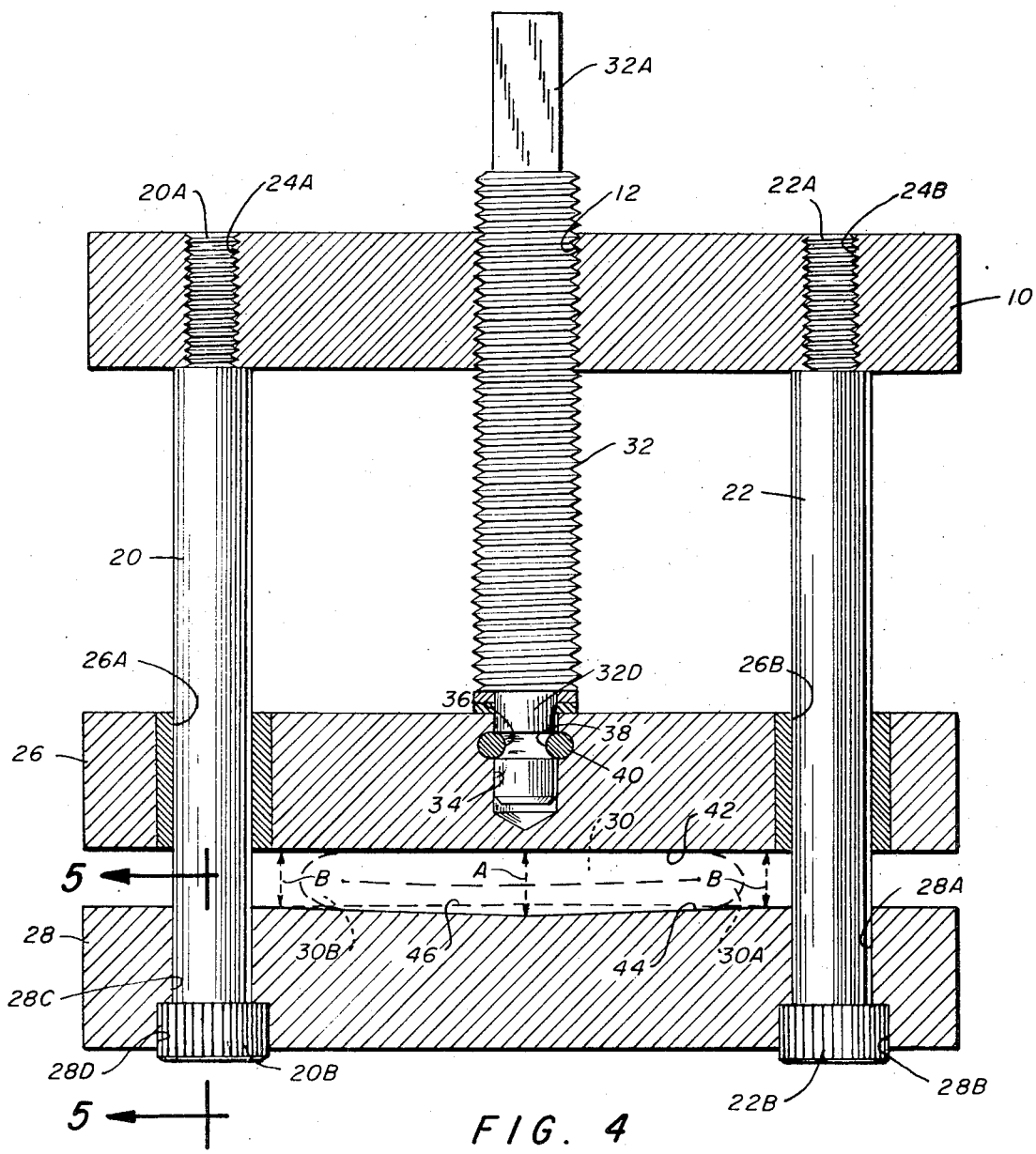
FIG. 4 is a cross-sectional view of the tool taken along the line 4—4 of FIG. 2.

Referring to the drawings and first to FIGS. 1, 2 and 4, an exemplified embodiment of the tool of this invention is shown. The tool includes a support bar 10 having a threaded opening 12 intermediate the ends thereof. Affixed to support bar 10 is a hub 14 which receives a threaded end of a handlebar 16. The outer end of the handlebar is provided with a handgrip 18 to facilitate the use of the tool.

Affixed to the support bar in spaced apart paralleled relationship are two rod members 20 and 22. As shown in FIG. 4, each rod member includes a reduced diameter threaded portion 20A and 20B respectively received in threaded openings 24A and 24B in support bar 10.

Flexible tubing is squeezed between a first clamp bar 26 and a second clamp bar 28. First clamp bar 26 has spaced apart openings 26A and 26B which slidably receive rod members 20 and 22 respectively. Openings 26A and 26B are shown with bushings, however, this is an optional design feature.

Figure 5:
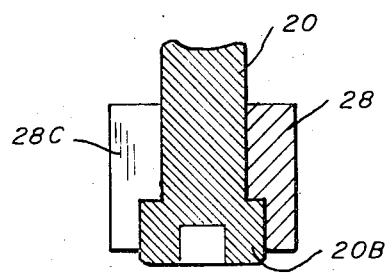
FIG. 5 is a partial cross-sectional view taken along the line 5—5 of FIG. 4.

Second clamp bar 28 includes, at one end, a first opening 28A which rotatably receives the lower end of rod member 22. The rod member 22 is provided with an enlarged diameter portion 22B which is received in an enlarged portion 28B of opening 28A. Second clamp bar includes, at the other end, a slot 28C (see FIGS. 3, 4 and 5). The lower portion of the slot is provided with an enlarged diameter 28D which receives enlarged end portion 20B of first rod member 20. The slot 28C permits second clamp bar 28 to be pivoted away from the first rod member 20 and around second rod member 22 to provide a means whereby a flexible tubing, indicated in dotted outline by the numeral 30, may be inserted between or removed from between the clamp bars.

Received in threaded opening 12 in support bar 10 is an externally threaded stem member 32. The upper end of stem member 32 is configured to receive a wrench whereby the stem member may be rotated for threaded movement relative to the support bar 10. The lower, reduced diameter, end 32B of the stem is rotatably received in a cylindrical recess 34 in clamp bar 26. The recess 34 includes a groove 36 in the periphery which matches a groove 38 in a stem portion 32B. A keeper ring 40 fits in grooves 36 and 38 and permits the rotation of stem member relative to clamp bar but retains the reduced diameter portion 32B in recess 34.

Of particular importance to the invention is the configuration of contacting surface 42 of first clamp bar 26 and contacting surface 44 of second clamp bar 28. Seen best in FIG. 2, the contacting surfaces 42 and 44 are essentially straight in planes drawn parallel the longitudinal axis of the pipe 30 received within the clamp, the flat surfaces 42 and 44 being rounded at the edges. As seen best in FIG. 4, the contacting surfaces 42 and 44 of clamp bars 26 and 28 are configured such that the distance between the contacting surfaces (indicated by dotted line A) is greater intermediate the length of the clamp bars than is the distance at the ends (indicated by the dotted line B). This configuration causes greater pressure to be applied to the end folds of the pipe 30 as it is pressed between the clamp bars than at the center of the pipe.

To achieve the difference between distance A and distance B various configurations may be provided. In one instance both the contacting surfaces 42 and 44 may be of obtuse V-shaped configuration. In the illustrated embodiment surface 42 of clamp bar 26 is straight as measured in a plane perpendicular longitudinal axis of pipe 30, while the contacting surface 44 of clamp bar 28 may be of obtuse V-shaped configuration. To illustrate the obtuse V-shaped configuration of contacting surface 44 of second clamp bar 28 a dotted line 46 shows the departure of this surface from that of a straight line drawn between the end portion.

OPERATION OF THE INVENTION

When it is desired to close a flexible pipe by means of the tool of this invention stem 32 is rotated by use of a wrench applied to end 32A in a direction to withdraw the first clamp bar 26 towards support bar 10. Second clamp bar 28 is then pivoted around second rod member 22 and the clamp positioned over the flexible pipe. Second clamp bar 28 is pivoted back into position as shown in the drawings and stem member 32 is rotated so as to move the first clamp bar 26 towards second clamp bar 28. As first clamp bar 26 forces pipe 30 toward the second clamp bar 28 the pipe is collapsed until the interior walls of the pipe engage throughout the interior surface closing the pipe against the passage of liquids or gases. The increased pressure applied on the end folds 30A and 30B of the pipe by the configuration of contacting surfaces 42 and 44 insure a more leakproof closure, with the same amount of force applied to the pipe, than is obtained by other known types of squeeze off tools.

The tool is left in the clamped position, as shown in the drawings, as long as it is desired to close the pipe 30. When it is desired to open the pipe stem 32 is rotated in the opposite direction until all pressure is removed from tubing 30. At this time second clamp bar 28 may be swung from engagement with first rod member 30 and the tool is removed from the pipe.

The amount of deformity occasioned to pipe 30 by the use of the tool depends upon several factors including primarily the composition of the pipe but secondarily upon the age of the pipe and the temperature at which it is worked. The tool is primarily intended for use as an emergency measure and in some instances, after the emergency condition has been eliminated and the tool removed it is desirable to cut out and replace the section of pipe which has been squeezed closed.

The exact dimensions of the tool will vary according to the size of pipe to which it is to be applied, and possibly to the composition of the pipe. As an example, when used on 2" polyethylene pipe of the type currently commonly used by the gas distribution industry in the United States the difference between the distances A and B is preferably approximately 1/32 to 1/16 inches.

As previously stated, the contacting surfaces 42 and 44 of clamp bars 26 and 28 respectively are flat in planes parallel the axis of pipe 30 received in the clamp. Each flat contacting surface 42 and 44 is rounded at each longitudinal edge. The provision of such flat contacting surfaces 42 and 44 affords advantages over clamps which utilize cylindrically configured clamp bars. First, it has been discovered that the flat contacting surfaces of this invention are more effective to close off the pipe. Apparently the increased contact area of the internal surfaces of the squeezed pipe achieves this improved result. Second, the flat contacting surfaces of the clamp shown herein substantially diminishes permanent distortion and other damage done to pipe on which the clamp is used.

While the salient features of the clamp described herein are important alone, the clamp performs best when the features are used in combination with each other. For instance, the flat configured contacting surfaces 42 and 44 are important and the clamp bars having contacting surfaces with the distance therebetween greater intermediate the length of the bars than at the ends is also important, however, maximum effectiveness is achieved when these two features are incorporated together in a pipe clamp.

While the invention has been described with a certain amount of particularity it is manifest that many changes may be made in the details of construction and the arrangement of components without departing from the spirit and scope of this disclosure. It is understood that the invention is not limited to the specific exemplary apparatus set forth herein but is limited only by the scope of the attached claim or claims, including the full range of equivalency to which each element thereof is entitled.

What is claimed:

1. A tool for squeezing off flexible pipe comprising:
   a support bar;
   two guide rods depending from said support bar and spaced apart to receive said pipe therebetween;
   a first clamp bar affixed to said guide rods;
   a second clamp bar parallel to said first and movable along said guide rods axially away from or toward said first clamp bar, and adapted to receive flexible pipe therebetween, the bars having opposed rigid pipe contacting surfaces, the contacting surface between said guide rods of one said clamp bar being a single obtuse v-shape as configured in a plane perpendicular the axis of pipe received in the clamp, that portion of the opposite contacting surface of the other of said clamp bars between said guide rods being a planar surface which extends the entire distance between said rods so that the distance between the contacting surfaces is greater intermediate the length of the bars than at the ends; and
   means to force said second clamp toward said first clamp bar.

2. A tool for squeezing off flexible pipe according to claim 1 wherein:
   said support bar includes a central threaded opening; and
   said means comprises a threaded stem received in said threaded opening of said support bar having one end rotatably affixed to said second clamp bar, the other end of the threaded stem having wrench receiving means thereon whereby rotation of the stem moves said second clamp bar towards or away from said first clamp bar.

3. A tool for squeezing off flexible pipe according to claim 2 wherein said first clamp bar is rotatably affixed to the end of one of said rod members and releasably affixed to the end of the other rod member whereby said first clamp bar may be pivoted to permit flexible pipe to be received between or removed from between said clamp bars.

4. A tool for squeezing off flexible pipe according to claim 2 including:

a handlebar having one end affixed to said support bar and extending perpendicular the axis of said threaded opening.

* * * * *